United States Patent
Phillips

(10) Patent No.: US 7,233,240 B2
(45) Date of Patent: Jun. 19, 2007

(54) SYSTEM AND METHOD FOR MONITORING CHILDREN USING SCHOOL AND DAYCARE TRANSPORTATION

(76) Inventor: Barbara N. Phillips, 1880 Dexter Chase Cr. #104, Cordova, TN (US) 38016

( * ) Notice: Subject to any disclaimer, the term of this patent is extended or adjusted under 35 U.S.C. 154(b) by 252 days.

(21) Appl. No.: 11/125,194

(22) Filed: May 10, 2005

(65) Prior Publication Data
US 2006/0017564 A1 Jan. 26, 2006

Related U.S. Application Data

(60) Provisional application No. 60/590,359, filed on Jul. 23, 2004.

(51) Int. Cl.
*G08B 1/08* (2006.01)
*H04Q 7/00* (2006.01)

(52) U.S. Cl. .............................. 340/539.13; 340/573.1; 701/207

(58) Field of Classification Search ........... 340/539.13, 340/539.11, 572.1, 572.2, 573.1; 701/207
See application file for complete search history.

(56) References Cited

U.S. PATENT DOCUMENTS

| | | | |
|---|---|---|---|
| 4,476,381 A | 10/1984 | Rubin | 235/375 |
| 4,857,716 A | 8/1989 | Gombrich et al. | 235/462 |
| 5,423,574 A * | 6/1995 | Forte-Pathroff | 283/75 |
| 5,525,969 A * | 6/1996 | LaDue | 340/573.4 |
| 5,765,875 A | 6/1998 | Rowley | 283/74 |
| 5,933,098 A * | 8/1999 | Haxton | 340/539.1 |
| 6,107,915 A | 8/2000 | Reavell et al. | 340/433 |
| 6,144,304 A | 11/2000 | Webb | 340/573.4 |
| 6,169,498 B1 * | 1/2001 | King et al. | 340/686.1 |
| 6,262,656 B1 * | 7/2001 | Byrd et al. | 340/539.13 |
| 6,346,886 B1 | 2/2002 | De La Huerga | 340/573.1 |
| 6,502,030 B2 * | 12/2002 | Hilleary | 701/207 |
| 6,658,348 B2 | 12/2003 | Rudd et al. | 701/207 |
| 6,667,686 B2 | 12/2003 | Talbot | 340/433 |
| 6,906,813 B1 * | 6/2005 | Tuchitoi et al. | 358/1.14 |
| 6,989,751 B2 * | 1/2006 | Richards | 340/572.4 |
| 7,109,869 B2 * | 9/2006 | Sweatte | 340/573.1 |
| 7,123,126 B2 * | 10/2006 | Tanaka et al. | 340/539.13 |
| 7,174,171 B2 * | 2/2007 | Jones | 340/539.13 |
| 2002/0149490 A1 | 10/2002 | Butler et al. | 340/667 |
| 2004/0039607 A1 | 2/2004 | Savitz et al. | 705/3 |

FOREIGN PATENT DOCUMENTS

EP 1003121 5/2000

OTHER PUBLICATIONS www.usatoday.com/tech/news/2002/02/06/bus-tracking.htm.

* cited by examiner

*Primary Examiner*—John Tweel, Jr.
(74) *Attorney, Agent, or Firm*—Richard C. Litman

(57) ABSTRACT

A system includes a global positioning system that tracks and monitors the school and daycare transportation, a plurality of barcode scanners which enter the children into the system and a plurality of barcode bracelets, with a barcode bracelet provided to each of the children that is scanned with the plurality of barcode scanners when a child is entering onto and coming off of the school and daycare transportation. There is also a plurality of school stations that enter and remove the drivers from the system and a central control center that constantly monitors the plurality of school stations and the global positioning system, the plurality of barcode scanners and the plurality of barcode bracelets.

16 Claims, 4 Drawing Sheets

SYSTEM AND METHOD FOR MONITORING CHILDREN USING SCHOOL AND DAYCARE TRANSPORTATION

This application claims the benefit of U.S. Provisional Application No. 60/590,359 filed Jul. 23, 2004.

BACKGROUND OF THE INVENTION

1. Field of the Invention

The present invention relates to a system and method for monitoring children using school and daycare transportation. More particularly, the system utilizes bar code and GPS technology to monitor school vehicles and children.

2. Description of the Related Art

Child safety is one of the most important issues in these modern times. In fact, administrators will say that child safety is paramount above any other factors. Parents have also provided pressure on school officials for greater safety both in the schools and when children are being transported. The related art outlines several systems that are designed for child and passenger safety.

United States Patent Application Publication No. 2002/0149490 published on Oct. 17, 2002, outlines the use of a passenger seat detection system for vehicles. The detection system will alert the driver of a vehicle if people or objects are remaining on a seat within a particular vehicle. Each seat will contain an incorporated sensor, which will detect the weight of an object or person sitting on that seat. The sensor is electronically connected to an internal electronic system that connects up to a dashboard light and horn, alerting a driver to the presence of someone or something remaining on the vehicle.

United States Patent Application Publication No. 2003/0030550 published on Feb. 13, 2003, outlines the use of a bus safety system for reminding a driver to search a bus for passengers with a receiver module incorporating a microprocessor, the receiver module programmed to control an alarm based on at least one selected time interval following activation.

U.S. Pat. No. 5,423,574 issued to Forte-Pathroff on Jun. 13, 1995, outlines the use of a child loss prevention system, which includes a wrist bracelet that is given to a child and accompanying adult at the time the child is left with a childcare facility or upon entering a large public facility such as a shopping mall or amusement park. Information printed on the bracelet at that time may be in the form of a bar code or a string of alphanumeric characters, or a combination of the two. When the adult attempts to leave the facility with the child, the material printed on the bracelet of each of them is scanned, and if the information matches, the child is allowed to leave with the adult.

U.S. Pat. No. 5,525,969 issued to LaDue on Jun. 11, 1996, outlines the use of a monitoring device useful in home arrest, identification and surveillance activities, including a monitoring member communicatively linked to a remote communicator. The monitoring member may be secured to an animate or inanimate object by a strap including a plurality of charged and uncharged conductors therein.

U.S. Pat. No. 5,765,875 issued to Rowley on Jun. 16, 1998, outlines the use of an identification system for children traveling as a group under the guidance of a teacher. Each child carries an identification tag on a frangible length of bead chain. The tag has first identifying indicia such as an unduplicated number unique to that child and a second identifying indicia providing information relating to the group. The name of each child and of the group containing the child is written on an information sheet held by the teacher.

U.S. Pat. No. 6,107,915 issued to Reavell et al. on Aug. 22, 2000, outlines the use of a warning system for a multi-passenger vehicle such as a school bus, which prompts the driver to inspect the vehicle for passengers when shutting down the vehicle. In the preferred embodiment the system is activated when the vehicle safety flasher system is activated. Following activation, an alarm sounds when the vehicle electrical system is deactivated by shutting off the engine unless the bus driver activates an alarm delay switch and within a preset time interval activates a disarming switch located near the back of the passenger compartment.

U.S. Pat. No. 6,144,304 issued to Webb on Nov. 7, 2000, outlines the use of a parent-infant identification system that includes a matched set of three bracelets each bearing matching visual indicia and an electronically readable data button and a data button reading apparatus. Two of the three bracelets are sized to fit adult wrists and the third bracelet is sized to fit an infant wrist or ankle. The matching visual indicia include a color code and the data buttons each contain electronically readable data which allows the data buttons to be identified with the data button reader.

U.S. Pat. No. 6,502,030 issued to Hilleary on Dec. 31, 2002, outlines the use of a web-based vehicle tracking system that includes a passenger identification device that registers when a passenger boards and disembarks the vehicle. The web-based vehicle tracking system utilizes a vehicle information system that includes the passenger identification device and a base station network administrator to monitor the travel of a vehicle and the on-board status of a passenger.

U.S. Pat. No. 6,667,686 issued to Talbot on Dec. 23, 2003, outlines the use of a bus safety system for reminding a driver to search a bus for passengers with a receiver module incorporating a microprocessor, the receiver module programmed to control an alarm based on at least one selected time interval following activation. There is also a wire harness attachable between the receiver module and an electrical system of the bus and a transmitter incorporating an alarm deactivation switch to be adapted to send RF signals.

Although each of these patents and publications outline the use of novel and useful inventions, what is needed is a protection system and method for safely transporting infants and young children in a school and/or daycare center setting. Such a protection system would address a great and long-felt need in the marketplace for maximizing protection for these infants and young children.

None of the above inventions and patents, taken either singly or in combination, is seen to describe the instant invention as claimed. Thus a method for monitoring children using school/daycare transportation solving the aforementioned problems is desired.

SUMMARY OF THE INVENTION

The invention is a system for monitoring children and drivers using school and daycare transportation. The system includes a global positioning system that tracks and monitors the school and daycare transportation, a plurality of barcode scanners which enter the children into the system and a plurality of barcode bracelets, with a barcode bracelet provided to each of the children that is scanned with the plurality of barcode scanners when a child is entering onto and coming off of the school and daycare transportation.

There is also a plurality of school stations that enter and remove the drivers from the system and a central control center that constantly monitors the plurality of school stations and the global positioning system, the plurality of barcode scanners and the plurality of barcode bracelets.

Accordingly, it is a principal object of the invention to provide a safety monitoring system for young children and infants using school and daycare center transportation.

It is another object of the invention to provide a system to prevent infants and small children from being unattended in a school bus or van.

It is a further object of the invention to provide a safety monitoring system for young children and infants using school and daycare center transportation that has a constantly manned central control center.

Still another object of the invention is to provide an accurate and cost-effective way to ensure each child or infant is protected when using school and daycare transportation.

It is an object of the invention to provide improved elements and arrangements thereof for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

Figure 1:
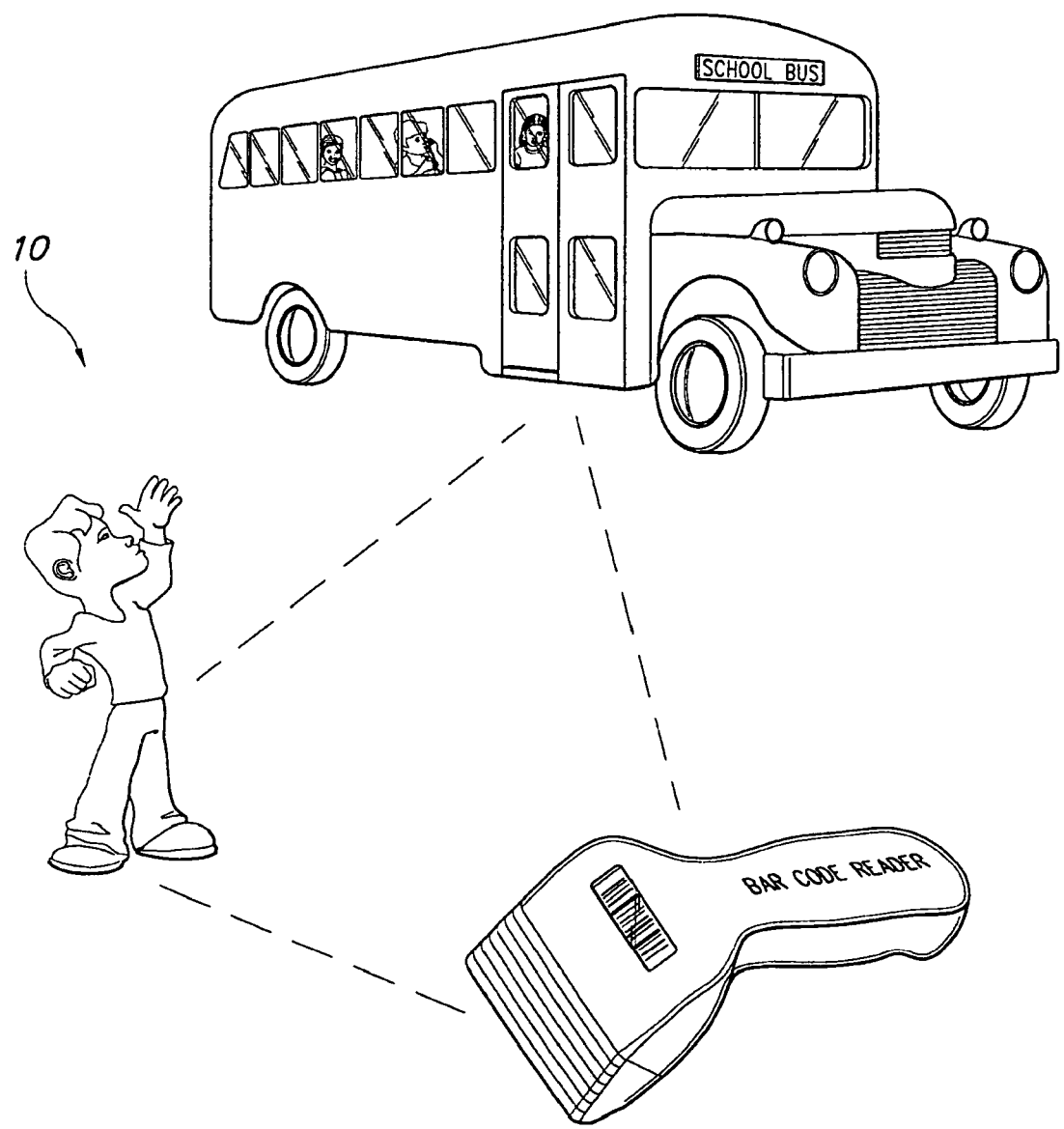
FIG. 1 is an environmental perspective view of a child with a bar code bracelet and scanner utilizing a system for monitoring children using school or daycare transportation.

The present invention is a system for monitoring children and drivers using school and daycare transportation 10, as is depicted in FIG. 1.

Figure 2:
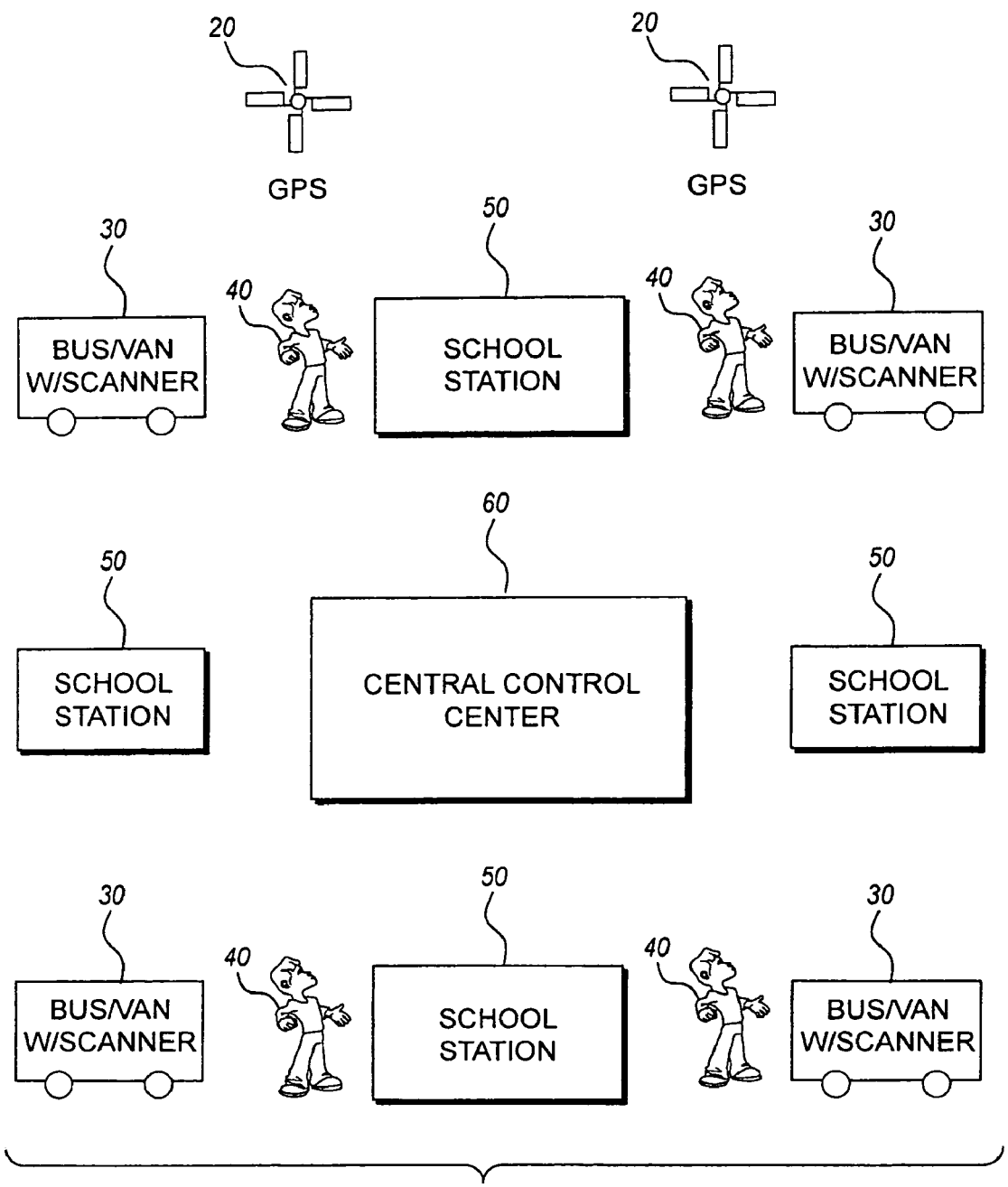
FIG. 2 is an overview of a system for monitoring children using school or daycare transportation according to the present invention.

As is shown in FIG. 2, the system for monitoring children and drivers using school and daycare transportation 10 comprises a global positioning satellite system 20 that tracks and monitors the school and daycare transportation, a plurality of barcode scanners 30 which enter the children into the system for monitoring children and drivers using school and daycare transportation 10 and a plurality of barcode bracelets 40, with a barcode bracelet 40 provided to each of the children that are scanned with the plurality of barcode scanners 30 when a child is entering onto and coming off of the school and daycare transportation. The system for monitoring children and drivers using school and daycare transportation 10 further comprises a plurality of school stations 50 that enter and remove the drivers from the system for monitoring children and drivers using school and daycare transportation 10 and a central control center 60 that constantly monitors the plurality of school stations 50 and the global positioning satellite system 20, the plurality of barcode scanners 30 and the plurality of barcode bracelets 40. Typically the school and daycare transportation will be in the form of school buses or passenger vans.

Figure 3:
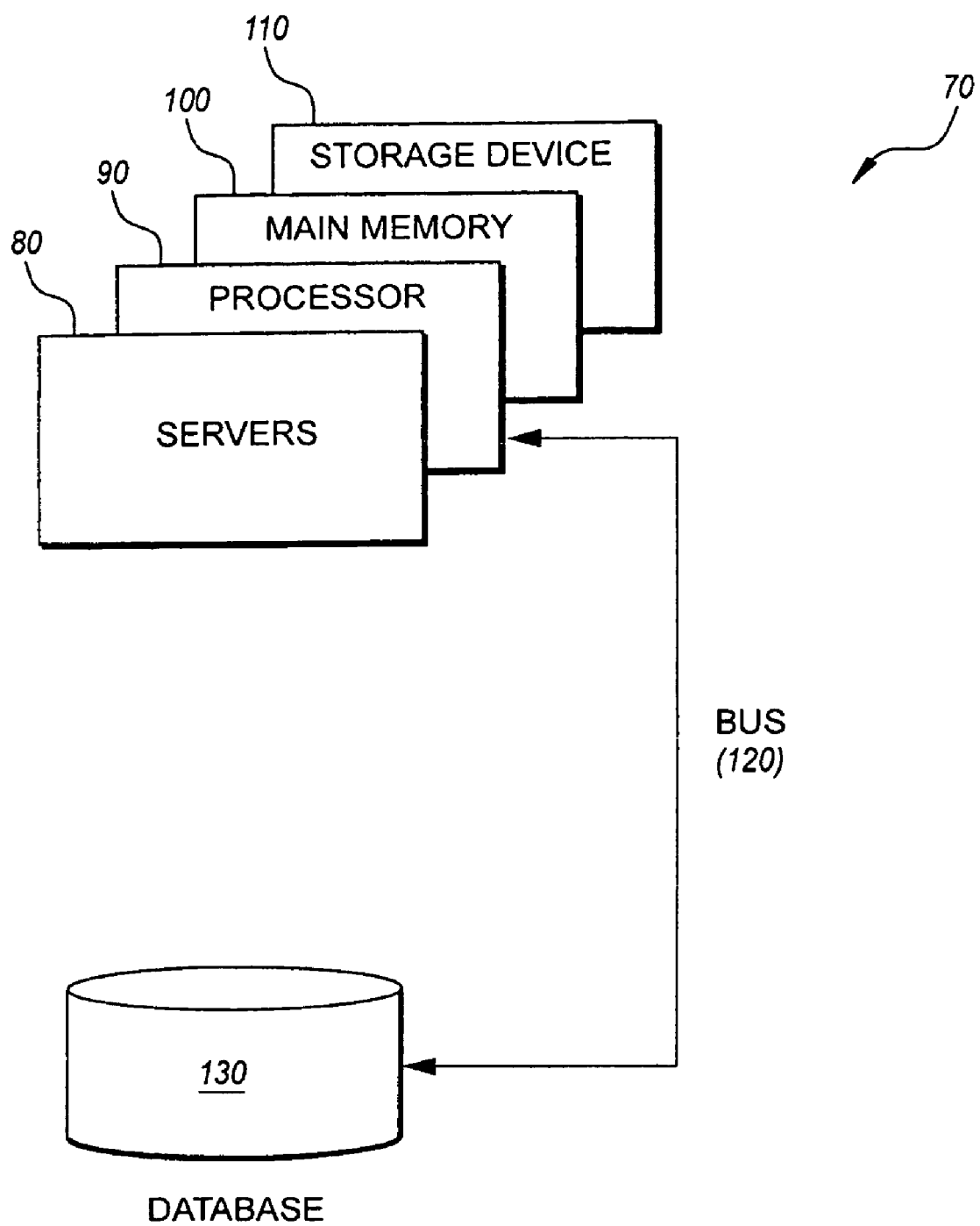
FIG. 3 is an overview of the database and computer technology used in the system for monitoring children using school or daycare transportation.

The system for monitoring children and drivers using school and daycare transportation 10 utilizes a computer system 70, which is outlined in FIG. 3. The computer system 70 comprises at least one server computer 80, a processor 90 and an area of main memory 100 for executing program code under the direction of the processor 90. The computer system 70 further comprises a storage device 110 for storing data and program code, a bus 120 connecting the processor 90 and the storage device 110 and at least one relational database 130 stored on the storage device 110.

The computer program code (not shown) stored in the storage device 110 and executing in the area of main memory 100 under direction of the processor 90, includes a server computer software means for monitoring children and drivers using school and daycare transportation, a means for entering each child into the system 10, a means for providing the children with a plurality of bar code bracelets 40 and a means for scanning the children when entering the school and daycare transportation. The computer program code also includes a means for tracking the school and daycare transportation when transporting the children, a means for scanning children after transport and a means for monitoring any irregularities.

Figure 4:
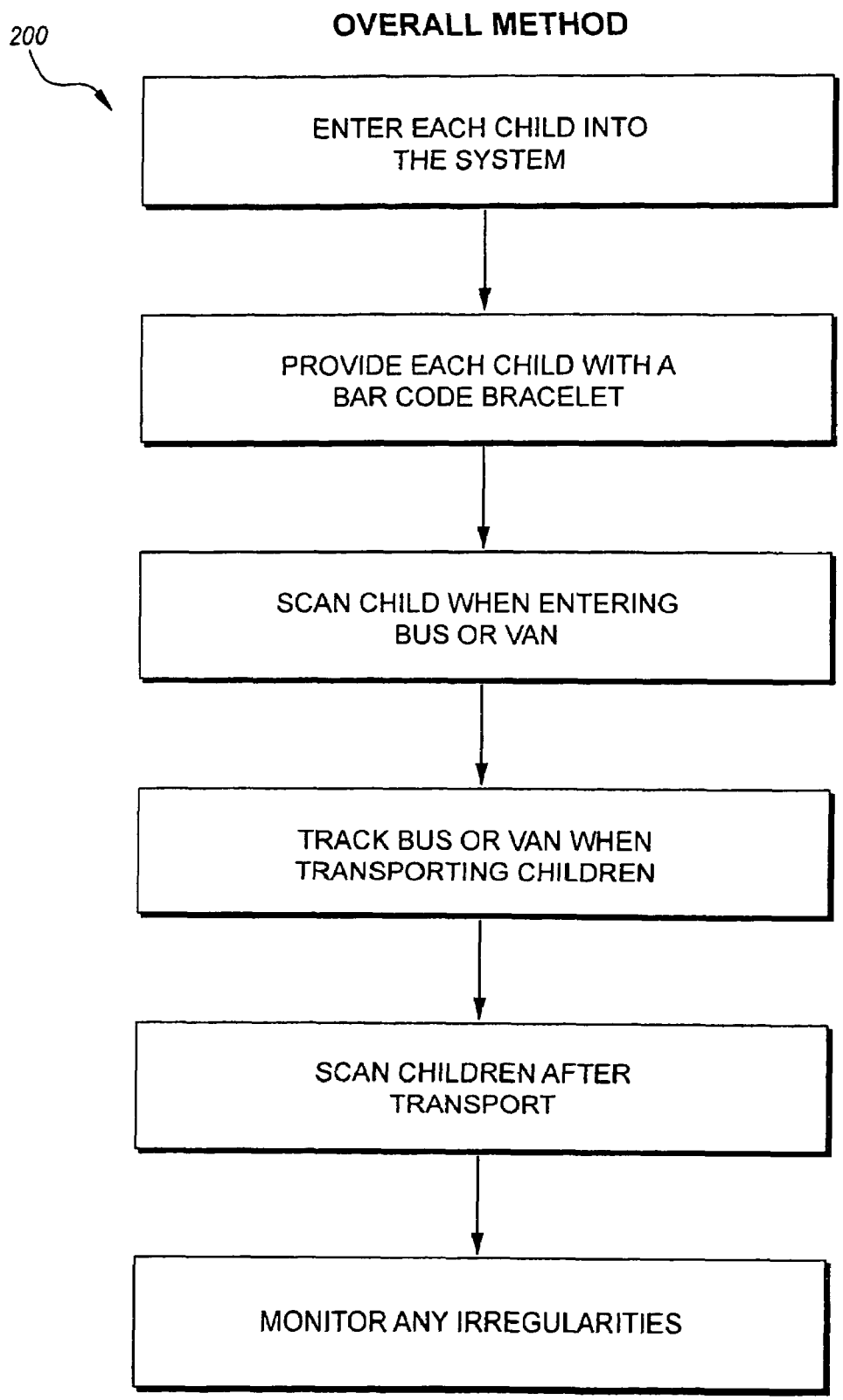
FIG. 4 is an overview of an overall method used to monitor children using school or daycare transportation.

Similarly, FIG. 4 outlines the steps for monitoring children and drivers using school and daycare transportation. These steps comprise entering the children into a system for monitoring children and drivers using school and daycare transportation, providing the children with a bar code bracelet and scanning the children when entering the school and daycare transportation. These steps further comprise tracking the school and daycare transportation when transporting children, scanning children after transport and monitoring the system for any irregularities.

Use of the system for monitoring children and drivers using school and daycare transportation 10 is straightforward. The system for monitoring children and drivers using school and daycare transportation 10 is designed to ensure the safety of children and infants using school and daycare transportation. Each child and infant is issued one of a plurality of barcode bracelets 40 with his or her bar code that will be scanned in at the time of pick-up and then scanned again when the bus or van has reached its final destination. Information will also be monitored at a school station 50 and the central control center 60 accessible only to authorized personnel. There is also a code for authorized personnel to enter in the case of a child or infant being absent.

While there are monitoring systems in the related art that monitor the absenteeism of children, the system for monitoring children and drivers using school and daycare transportation 10 monitors infants and children who are transported to and from school and daycare outings. If a child or infant is not going to school on a particular day, the parent must notify authorized school personnel that their child or infant will not be going to the school or the daycare center. This will prompt the school personnel to enter a "no show" code into the system 10. If a child or infant using one of a plurality of bar code bracelets 40 has been scanned in and the particular child or infant does not get scanned out at the time the bus or van has cleared all of its identification bracelet codes, the central control center 60 will place a call within minutes to the school station 50 for a clearance and location of the infant or child. This will include an extra check on the buses and vans in question. If a clearance and location of the child or infant cannot be made, the central control center 60 will call for a 911 emergency.

Each van or school bus that is set-up with the system for monitoring children and drivers using school and daycare transportation 10 will receive a certificate and a logo that will be in place in the window of each bus and van. Typically bus and van drivers and driver's aids will be scanned in at the school station 50 before picking-up any children or infants. The central control center 60 will monitor response times and will create monthly reports and will also keep track of transportation and travel times and will make sure all children and infants are accounted for.

It is to be understood that the present invention is not limited to the embodiment described above, but encompasses any and all embodiments within the scope of the following claims.

I claim:

1. A transportation monitoring and tracking system for monitoring passengers and transportation operators using passenger transportation, comprising:
   a geographical positioning system for tracking and monitoring passenger transportation in said transportation monitoring and tracking system;
   a plurality of portable unique identification devices provided to all passengers and transportation operators;
   a plurality of unique identification device readers that read and identify said plurality of portable unique identification devices provided to all passengers and transportation operators;
   a plurality of destination station unique identification device readers located at a common destination of said passenger transportation that read and identify said plurality of portable identification devices provided to all passengers and transportation operators;
   a central control station for continuously monitoring input received from said geographic positioning system, said plurality of portable unique identification devices provided to all passengers and transportation operators, and said plurality of destination station unique identification device readers, and determining if there are any passengers identified by said plurality of unique identification device readers but not identified by said plurality of destination station unique identification device readers at an end of a transportation route; and
   a database for storing and retrieving information correlating specific portable unique identification devices to individual passengers and individual transportation operators.

2. The transportation and monitoring system of claim 1, wherein said geographical positioning system is a global positioning system.

3. The transportation and monitoring system of claim 1, wherein said geographical positioning system has a communication link to said central control station that updates said central control station with real-time geographical positions of said passenger transportation.

4. The transportation and monitoring system of claim 1, wherein said central control system is notified of passenger absences and said central control system inputs an absence code for passengers designated as absent.

5. The transportation and monitoring system of claim 1, wherein said end of said transportation route is determined by said portable unique identification devices of transportation operators read by said destination station unique identification device readers.

6. The transportation and monitoring system of claim 1, wherein said central control system calculates transportation route times and generates periodic historical reports of transportation route times based on said geographical positioning system or said unique identification device readers and said destination unique identification device readers.

7. The transportation and monitoring system of claim 1, wherein said portable unique identification devices comprise portable barcode devices, and said unique identification device readers comprise barcode scanning devices.

8. A method of monitoring and tracking passengers, transportation operators and transportation vehicles in a transportation system, said method of monitoring and tracking comprising:
   entering information regarding a specific passenger into a central database;
   issuing a portable unique identification device to said specific passenger wherein said portable unique identification device corresponds to information regarding said specific passenger from said step of entering;
   reading said portable unique identification device of said specific passenger upon entering a specific transportation vehicle in said transportation system to create an entrance information record of said specific passenger;
   communicating said entrance information record to a central control station;
   reading said portable unique identification device of said specific passenger upon exiting said specific transportation vehicle at a destination station unique identification device reader to create an exit information record of said specific passenger;
   communicating said exit information record to said central control station;
   comparing said entrance information record to said exit information record at said central control station; and
   generating a record from said step of comparing.

9. The method of monitoring and tracking passengers, transportation operators and transportation vehicles in a transportation system of claim 8, further comprising the step of:
   communicating geographical coordinates of said transportation vehicles to said central control station by a geographic positioning system located on each of said transportation vehicles.

10. The method of monitoring and tracking passengers, transportation operators and transportation vehicles in a transportation system of claim 8, wherein said portable unique identification devices comprise portable barcode devices, and said unique identification device readers comprise barcode scanning devices.

11. A method of monitoring and tracking passengers, transportation operators and transportation vehicles in a transportation system, said method of monitoring and tracking comprising:
   entering information regarding a plurality of passengers into a central database;
   entering information regarding a specific transportation operator in said central database;
   issuing portable passenger unique identification devices to each of said plurality of passengers wherein each of said portable passenger unique identification devices corresponds to information regarding each of said plurality of passengers from said step of entering information regarding said plurality of passengers;
   issuing a portable operator unique identification device to said specific transportation operator wherein said portable operator identification device corresponds to information regarding said specific operator from said step of entering information regarding said specific transportation operator;

reading said portable operator unique identification device of said specific transportation operator upon entering a specific transportation vehicle in said transportation system at the beginning of a transportation route to create a transportation route initiation record for said specific transportation operator;

communicating said transportation route initiation record to a central control station;

reading said portable passenger unique identification devices of said plurality of passengers upon entering said specific transportation vehicle in said transportation system to create an entrance information record for each of said plurality of passengers;

communicating said entrance information record for each of said plurality of passengers to said central control station;

reading said portable passenger unique identification device for each of said plurality of passengers upon exiting said specific transportation vehicle at a destination station unique identification device reader to create an exit information record for each of said plurality of passengers;

communicating said exit information records to said central control station;

reading said portable operator identification device of said specific transportation operator upon completion of said transportation route to create a transportation route completion record for said specific transportation operator;

communicating said transportation route completion record to said central control station;

determining the completion of said transportation route based on the step of communicating said transportation route initiation record and communicating said transportation route completion record to said central control station;

comparing said entrance information records of each of said plurality of passengers to said exit information records of each of said plurality of passengers at said central control station;

determining if there are any entrance information records with corresponding exit information records, and generating a record of all corresponding entrance and exit information records;

determining if there are any entrance information records without corresponding exit information records, and generating a record of all entrance information records having no corresponding exit information records;

identifying said specific passengers having no corresponding exit information records based on said step of determining if there are any entrance information records without corresponding exit information records, by retrieving specific passenger information corresponding to specific passenger unique identification information from said central database; and notifying the location of said destination station unique identification device reader of any passengers having not corresponding exit information records at said location of said destination station unique identification device reader.

12. The method of monitoring and tracking passengers, transportation operators and transportation vehicles in a transportation system of claim 11, said step of notifying further comprising calling emergency services with information provided from:

1) said step of identifying said specific passengers having no corresponding exit information records;
2) said location of said destination station unique identification device reader;
3) said transportation operator; and
4) said transportation route.

13. The method of monitoring and tracking passengers, transportation operators and transportation vehicles in a transportation system of claim 11, wherein said specific transportation vehicle has a geographic positioning system in communication with said central control station, further comprising the step of:

communicating real-time geographic positioning information to said central control station during said transportation route.

14. The method of monitoring and tracking passengers, transportation operators and transportation vehicles in a transportation system of claim 11, further including the step of:

receiving notification of passenger absences at said central control station;

designating, at said central control station, information regarding passenger absences;

considering said information regarding passenger absences in said step of determining if there are any entrance information records without corresponding exit information records.

15. The method of monitoring and tracking passengers, transportation operators and transportation vehicles in a transportation system of claim 11, wherein said specific transportation vehicle has a geographic positioning system for communication geographic positioning information with said central control station, further comprising the steps of:

calculating transportation route times based on said geographical positioning system information, or based on said steps of 1) reading said portable passenger unique identification devices of said plurality of passengers upon entering said specific transportation vehicle, and
2) reading said portable passenger unique identification device for each of said plurality of passengers upon exiting said specific transportation vehicle; and generating periodic historical reports of transportation route times based on said step of calculating.

16. The method of monitoring and tracking passengers, transportation operators and transportation vehicles in a transportation system of claim 11, wherein said portable unique identification devices comprise portable barcode devices, and said unique identification device readers comprise barcode scanning devices.

* * * * *